(12) United States Patent
Hill et al.

(10) Patent No.: US 7,965,909 B2
(45) Date of Patent: Jun. 21, 2011

(54) FIBRE-OPTIC SURVEILLANCE SYSTEM

(75) Inventors: David J Hill, Dorchester (GB); Philip J Nash, Dorchester (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 10/573,671

(22) PCT Filed: Sep. 24, 2004

(86) PCT No.: PCT/GB2004/004076
§ 371 (c)(1),
(2), (4) Date: Mar. 24, 2006

(87) PCT Pub. No.: WO2005/031270
PCT Pub. Date: Apr. 7, 2005

(65) Prior Publication Data
US 2006/0257066 A1 Nov. 16, 2006

(30) Foreign Application Priority Data
Sep. 24, 2003 (GB) .................................... 0322351.8

(51) Int. Cl.
*G02B 6/00* (2006.01)
(52) U.S. Cl. .......................... 385/12; 385/141; 436/164
(58) Field of Classification Search ................... 385/12, 385/141; 436/164
See application file for complete search history.

(56) References Cited

U.S. PATENT DOCUMENTS

| | | | |
|---|---|---|---|
| 4,572,950 A | 2/1986 | Harmer | |
| 4,812,645 A | 3/1989 | Griffiths | |
| 5,134,386 A | 7/1992 | Swanic | |
| 5,140,154 A | 8/1992 | Yurek et al. | |
| 5,710,648 A * | 1/1998 | Frigo | 398/108 |
| 5,946,429 A * | 8/1999 | Huang et al. | 385/12 |
| 5,991,479 A * | 11/1999 | Kleinerman | 385/31 |
| 6,542,228 B1 * | 4/2003 | Hartog | 356/73.1 |
| 6,575,033 B1 * | 6/2003 | Knudsen et al. | 73/514.26 |
| 7,036,601 B2 * | 5/2006 | Berg et al. | 166/385 |
| 7,187,620 B2 * | 3/2007 | Nutt et al. | 367/25 |
| 2002/0136091 A1 * | 9/2002 | Pearce et al. | 367/188 |
| 2002/0194932 A1 * | 12/2002 | Gysling et al. | 73/861.42 |
| 2003/0066359 A1 * | 4/2003 | Gysling et al. | 73/861.23 |
| 2004/0080432 A1 * | 4/2004 | Hill et al. | 340/942 |
| 2005/0253049 A1 * | 11/2005 | Westhall et al. | 250/227.14 |

(Continued)

FOREIGN PATENT DOCUMENTS
EP 0 365 062 A1 4/1990
(Continued)

OTHER PUBLICATIONS

Cranch et al, "Large-Scale Multiplexing of Interferometric Fiber-Optic Sensors Using TDM and DWDM", Journal of Lightwave Technology, vol. 19, No. 5, May 2001, pp. 687-699.*

(Continued)

*Primary Examiner* — Ellen Kim
(74) *Attorney, Agent, or Firm* — Nixon & Vanderhye P.C.

(57) ABSTRACT

A fiber-optic surveillance system (10) includes a fiber-optic sensor (15) comprising a serial array (15) of fiber-optic point-sensors (16), successive point-sensors being linked by a distributed fiber-optic sensor (18). The system allows the location of intruder events along the sensor to be determined, and provides a reduction in the incidence of false-alarms compared to prior art systems.

14 Claims, 1 Drawing Sheet

U.S. PATENT DOCUMENTS

2006/0157239 A1 * 7/2006 Ramos et al. .............. 166/254.2

FOREIGN PATENT DOCUMENTS

| GB | 2 176 364 A | 12/1986 |
| GB | 2 262 803 A | 6/1993 |
| JP | 2-242119 | 9/1990 |
| JP | 2003-254724 | 9/2003 |

OTHER PUBLICATIONS

International Search Report of PCT/GB2004/004076, mailed Jan. 5, 2005.

GB Search Report of GB 0322351.8, dated Feb. 5, 2004.

* cited by examiner

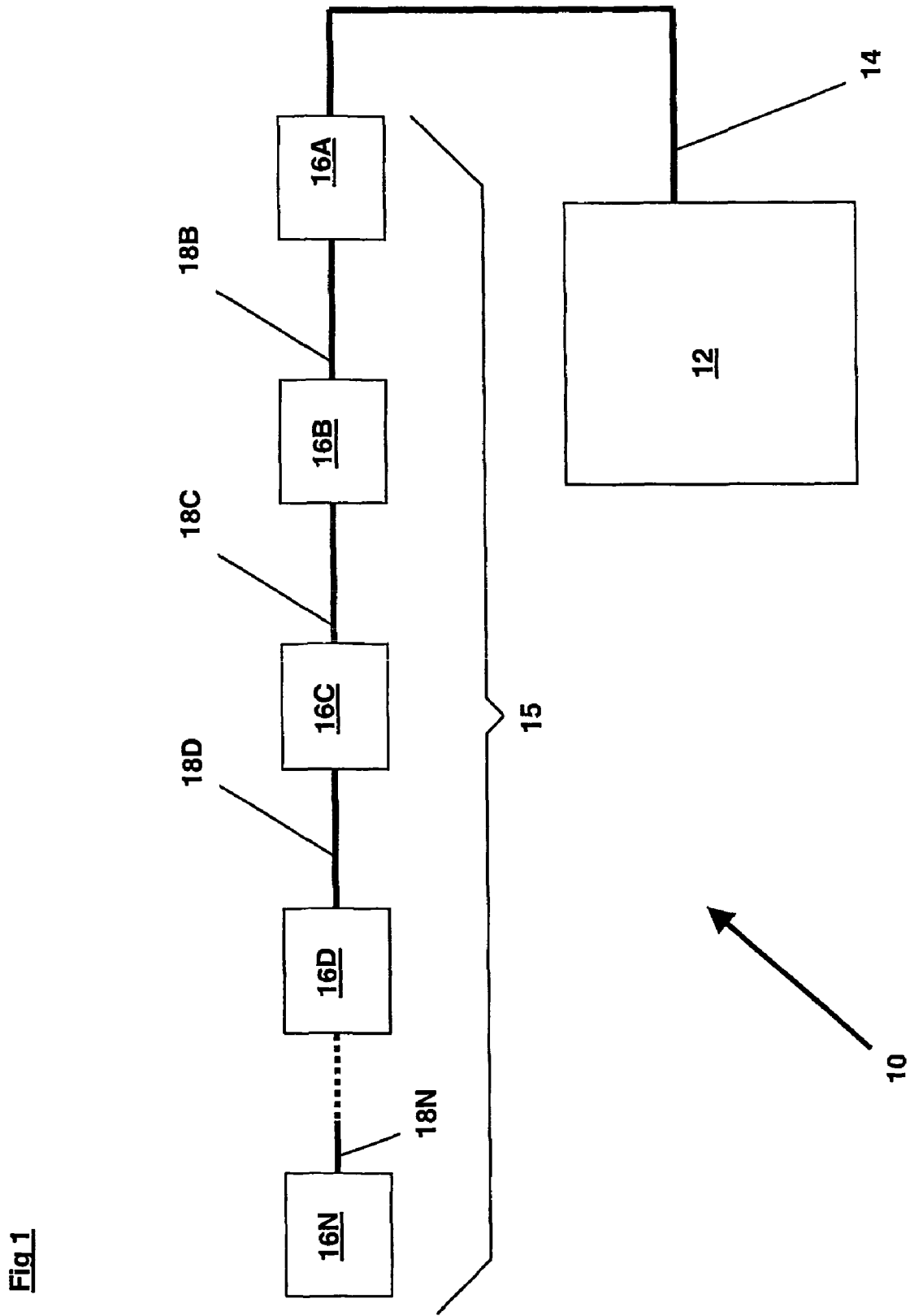

FIBRE-OPTIC SURVEILLANCE SYSTEM

This application is the US national phase of international application PCT/GB2004/004076, filed 24 Sep. 2004, which designated the U.S. and claims priority of GB 0322351.8, filed 24 Sep. 2003, the entire contents of each of which are hereby incorporated by reference.

The present invention relates to fibre-optic surveillance systems, particularly fibre-optic perimeter surveillance systems.

It is known to use optical fibres as sensing elements to detect pressure, strain etc, with conditions external to an optical fibre being inferred from changes in characteristics, such as amplitude, frequency or polarisation, in light output from the fibre. An example is the pressure sensor described in European Patent number 0 365 062.

One approach to perimeter surveillance is to arrange a single length of optical fibre below ground level around a perimeter to be monitored, and to couple radiation from an LED or laser-diode into the fibre. Pressure on the fibre due to the weight of a person, vehicle or other object crossing a perimeter defined by the fibre causes a change in the amount of radiation back-scattered within the fibre (due to bending of the fibre), and hence the presence of an intruder can be detected. However, such a system has three significant disadvantages, namely (i) the position at which an intruder crosses the perimeter cannot be determined accurately, (ii) a significant false-alarm rate, (iii) no information is given about the nature if the intruding person or object and (iv) an inability to multiplex multiple sensing zones on a single fibre. Alternatively, the transmission of the fibre may be monitored as described in U.S. Pat. No. 4,812,645. This types of system has similar drawbacks.

Optical fibre interferometric sensors can be used to detect pressure and vibration. When a length of optical fibre is subjected to an external pressure the fibre is deformed. This deformation alters the optical path length of the fibre, which can be detected as a change in phase of light passing along the fibre. As it is possible to analyse for very small changes in phase, optical fibre sensors are extremely sensitive to applied pressure. Such a sensor is described as an interferometric sensor. This high sensitivity allows optical fibre sensors to be used for example, in acoustic hydrophones where sound waves with intensities equivalent to a pressure of $10^{-4}$ Pa are routinely detectable. Published UK patent application 2 262 803 describes an interferometric system having a serial array of distributed fibre-optic sensors, however such a system provides no accurate positional information about an intruder or information relating to the nature of the intruder.

Published UK patent application 2 176 364 discloses a serial array of localised fibre-optic sensors. This system is only able to provide detection if an intruding person, vehicle etc passes one of the localised sensors.

According to a first aspect of the invention, these problems are ameliorated by a fibre-optic sensor array for a surveillance system characterised in that the sensor array comprises a at least two fibre-optic point sensors, in which each pair of successive point sensors are linked by a distributed fibre-optic sensor.

Optical fibre sensors have the advantage that they can be multiplexed without recourse to local electronics. Interferometric sensors can also be formed into distributed sensors with a length sufficient to cover that of typical security zone perimeters (20-100 m). By adopting this hybrid approach of point sensors and interstitial distributed sensors the system benefits from a high detection efficiency.

A second aspect of the invention provides a fibre-optic surveillance system characterised in that the system comprises a fibre optic sensor of the invention connected to an interrogation system adapted to respond to an optical phase shift in at least one sensor of the array due to a force applied to that sensor and to establish the position the position at which said force is applied.

The force could be applied by a person, animal, vehicle or other object crossing a path which is under surveillance, with the sensor array being positioned on or near the path, or underneath it.

This provides a low cost, reliable fibre-optic surveillance system which is suitable for perimeter monitoring and which can be highly multiplexed. Remote interrogation is possible so neither local electronics nor local electrical power are required.

The fibre-optic sensor array may be connected to the interrogation system by a fibre-optic cable or alternatively by a transducer and a wire cable.

The fibre-optic point sensors may comprise optical fibre wound into a flexural disc, or may for example be geophones.

Alternatively the fibre-optic point sensors may be fibre-optic accelerometers. The need to monitor extremely low levels of vibration in security and seismic survey has spurred the development of ever more sensitive accelerometers. Fibre optic technology has been applied to this particular field in the form of fibre-optic accelerometers based on interferometric techniques. The compliant cylinder approach to the design of a fibre-optic accelerometer is particularly effective when incorporated in such an interferometer. In one known approach a seismic mass is held in place by two compliant cylinders and around the circumference of each cylinder there being wound a single mode optical fibre, which form the arms of an interferometer. In another approach, a single compliant cylinder loaded with a seismic mass is wound circumferentially with an optical fibre.

The distributed fibre optic sensors preferably comprise optical fibre packages for measuring pressure on, or bend, of the distributed sensors.

Preferably, the interrogation system comprises a reflectometric interferometric interrogation system, more preferably the interferometric interrogation system comprises a pulsed reflectometric interferometric interrogation system in which Time Division Multiplexing (TDM) is used to distinguish individual sensors. This is a very efficient multiplexing architecture that can be used with distributed and point sensors. Furthermore wavelength Division multiplexing (WDM) can be used to increasing the number of sensors multiplexed on a single fibre further.

Alternatively, the interferometric interrogation system may comprise a Rayleigh backscatter interferometric interrogation system, with a pulsed Rayleigh backscatter interferometric interrogation system being particularly preferred.

A non-Rayleigh backscattering reflectometric system relies upon discrete reflectors between sensors. These are comparatively expensive components, which may add to the cost of the overall system. In contrast, Rayleigh backscattering relies on reflection of light from inhomogeneities in the optical fibre. This removes the need for discrete reflectors, reducing the overall cost of the system. However, the data collected from such a system requires more complex analysis than a reflectometric interrogation system.

A third aspect of the invention provides a method of establishing the position at which an object moving on the earth's surface crosses a closed path, or an open path of fixed length, thereon, characterised in that the method comprises the steps of (i) positioning a sensor according to claim 1 on or below said path; and (ii) analysing optical signals received from the sensor to establish the position of the object along the path, or the position at which the object has crossed said path.

The optical signals are preferably analysed by measuring the delay between the signals received from adjacent fibre-optic points sensors along the array and combining these signals with the signal from the distributed fibre-optic array linking those fibre-optic point sensors to locate and confirm the said position.

An embodiment of the invention are described below by way of example only and with reference to the accompanying drawing in which schematically illustrates a fibre-optic perimeter surveillance system according to the invention.

In FIG. 1, a fibre-optic perimeter surveillance system according to the invention is indicated generally by 10. The system 10 comprises a series of fibre-optic point sensors 16A, 16B, 16C, 16D, . . . , 16N (in this example, geophones) optically linked by a series of distributed fibre-optic sensors 18B, 18C, 18D, . . . , 18N to form a fibre-optic sensor array 15. A data link 14 couples the geophone 16A to an interrogation unit 12. The data link 14 may be a length of optical fibre, so that optical signals are passed to the interrogation unit 12, or alternatively it may comprise a detector which converts optical signals into electrical signals and either a fixed electrical, or wireless, link to the interrogation unit 12.

The distributed fibre-optic sensors 18B, 18C, 18D, . . . , 18N each have a physical length of 100 m. There are 250 geophones in the array 15, so that the separation of geophones 16A, 16N may be up to approximately 24.9 km.

Each of the geophones 16A, 16B, 16C, 16D, . . . , 16N comprises approximately 100 m of optical fibre wound onto a flexural disc, and is able to measure acceleration and displacement via strain induced in the fibre. Each of the distributed sensors 18B, 18C, 18D, . . . , 18N comprises 100 m of optical fibre packaged within a cable and can measure pressure on, or bend of, the cable, also via strain induced on the fibre.

The array 15 may be arranged in any desired configuration, for example it may be arranged around a closed path to provide perimeter surveillance for e.g. a building; alternatively it may be arranged in a linear manner to provide information on the location of a person/object crossing a straight line defined by the array 15.

The system 10 operates as follows. When a person or object crosses a line or perimeter on or underneath which the array 15 is positioned, a force resulting from the person's or object's weight (plus possibly also a force resulting from a change in momentum if there is an impact) is applied to the sensor array. This causes radiation within a distributed fibre-optic sensor corresponding to the location where the person/object crosses to be reflected back to geophone 16A and a corresponding signal giving approximate location is passed to the interrogation unit 12. More particularly the interrogation unit 12 is able to identify that a crossing has occurred somewhere along the length of the array 15. Radiation is also reflected back from the geophones at either end of that distributed sensor, and corresponding signals are also passed to the interrogation unit 12. The interrogation unit 12 carries out triangulation of the signals received from the distributed sensor and the geophones at either end of it to accurately determine the location along the array 15 at which the person/object has crossed on the basis of the time at which signals are received. By using data from both types of sensor, it is possible to provide much more accurate classification of the person/object than is achievable through use of one sensor type alone. Improved classification results in a lower false-alarm rate.

In the example system 10, the point fibre-optic sensors are geophones, however other types of fibre-optic point sensor may be used.

The number of point and distributed sensors may vary according to both the length of a perimeter or path which is desired to be monitored, and the accuracy with which it is desired to locate intruder events. The simplest fibre-optic sensor of the invention would comprise a single distributed sensor having a point sensor at each end.

Given that the detection range of a person walking using a ground mounted fibre optic accelerometer can be >30 m in certain ground types, an array of accelerometers positioned say 40 m apart will ensure full coverage of a perimeter.

By comparing signals received on adjacent accelerometers and measuring the time difference between common features on the signal it is possible to accurately calculate the position of the intrusion along the length of the interstitial fibre.

Further temporal and frequency analysis of the accelerometer signals and the singles received from the distributed interstitial sensing cable enable intrusion classification, thereby reducing the system false alarm rate.

Suitably, the known distance is between 20 m and 50 m. The known distance refers to the physical separation of the fibre optic sensors and is defined by the optical path length of the optical fibre between each sensor and the length of fibre used in each accelerometer.

The invention claimed is:

1. A fibre-optic surveillance system including:
   a fibre-optic sensor array comprising:
      at least two fibre-optic point sensors; and
      a distributed fibre-optic sensor linking said at least two fibre-optic point sensors, wherein said sensor array provides an array output of sensed data from said at least two fibre-optic point sensors and said distributed fibre-optic sensor; and
      an interferometric interrogation system, responsive to an output phase shift in at least one of said sensors indicative of a force applied to said at least one of said sensors, for establishing a position at which said force is applied.

2. A fibre-optic surveillance system according to claim 1 wherein the fibre-optic sensor array is connected to the interrogation system by a fibre-optic cable.

3. A fibre-optic surveillance system according to claim 1 wherein the fibre-optic sensor array is connected to the interrogation system by a transducer and a wire cable.

4. A fibre-optic surveillance system according to claim 1 wherein each of the fibre-optic point sensors comprises optical fibre wound into a flexural disc.

5. A fibre-optic surveillance system according to claim 1 wherein the fibre-optic point sensors are geophones.

6. A fibre-optic surveillance system according to claim 1 wherein each fibre-optic point sensor comprises a fibre-optic accelerometer.

7. A fibre-optic surveillance system according to claim 1 wherein the distributed fibre-optic sensor comprises optical fibre packages within a cable to measure one of pressure on the cable and bend of the cable.

8. The system of claim 1 wherein the interferometric interrogation system comprises a reflectometric interferometric interrogation system.

9. The system of claim 8 wherein the reflectometric interferometric interrogation system comprises a pulsed reflectometric interferometric interrogation system.

10. The system of claim 9 wherein the pulsed reflectometric interferometric interrogation system employs time-division multiplexing to distinguish individual sensors.

11. The system of claim 1 wherein the interrogation system comprises a Rayleigh-backscatter interrogation system.

12. The system of claim 11 wherein the Rayleigh-backscatter interrogation system comprises a pulsed Rayleigh-backscatter interrogation system.

13. A method of establishing the position at which an object moving on a surface crosses a path of fixed length, wherein said method comprises the steps of:

(i) positioning the fibre-optic sensor array of a surveillance system adjacent said path, said surveillance system including:

a fibre-optic sensor array comprising:

at least two fibre-optic point sensors; and a distributed fibre-optic sensor linking said at least two fibre-optic point sensors, wherein said sensor array provides an array output of sensed data from said at least two fibre-optic point sensors and said distributed fibre-optic sensor; and an interferometric interrogation system, responsive to an output phase shift in at least one of said sensors indicative of a force applied to said at least one of said sensors, for establishing a position at which said force is applied; and (ii) analysing optical signals received from the sensor array using the interferometric interrogation system of said surveillance system to establish the position of the object crossing the path.

14. A method according to claim 13, wherein the optical signals are analysed by measuring the delay between signals received from adjacent said at least two fibre-optic point sensors along the array and combining these signals with a signal from the distributed fibre-optic array linking said at least two fibre-optic point sensors to locate and confirm said position.

* * * * *